(12) United States Patent
Chen

(10) Patent No.: US 10,268,362 B2
(45) Date of Patent: Apr. 23, 2019

(54) METHOD AND SYSTEM FOR REALIZING FUNCTIONAL KEY ON SIDE SURFACE

(71) Applicant: HUIZHOU TCL MOBILE COMMUNICATION CO., LTD., Huizhou (CN)

(72) Inventor: Yichong Chen, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 46 days.

(21) Appl. No.: 15/312,892

(22) PCT Filed: May 18, 2016

(86) PCT No.: PCT/CN2016/082510
§ 371 (c)(1),
(2) Date: Nov. 21, 2016

(87) PCT Pub. No.: WO2017/054467
PCT Pub. Date: Apr. 6, 2017

(65) Prior Publication Data
US 2017/0285798 A1 Oct. 5, 2017

(30) Foreign Application Priority Data
Sep. 30, 2015 (CN) .......................... 2015 1 0636319

(51) Int. Cl.
*G06F 3/0488* (2013.01)
*G06F 1/16* (2006.01)
*G06F 3/0481* (2013.01)

(52) U.S. Cl.
CPC ............ *G06F 3/0488* (2013.01); *G06F 1/169* (2013.01); *G06F 1/1626* (2013.01); *G06F 1/1694* (2013.01); *G06F 3/04817* (2013.01); *G06F 3/04886* (2013.01); *G06F 2203/0339* (2013.01);
(Continued)

(58) Field of Classification Search
CPC ......... G06F 3/0488; G06F 2203/04104; G06F 2203/04808
See application file for complete search history.

(56) References Cited

U.S. PATENT DOCUMENTS

2013/0093680 A1* 4/2013 Ogita .................... G06F 1/1626
345/168
2014/0198057 A1* 7/2014 Xia ........................ G06F 3/0416
345/173
(Continued)

FOREIGN PATENT DOCUMENTS

WO    WO-2014/188990 A1 * 11/2014

*Primary Examiner* — Jeffery A Brier
(74) *Attorney, Agent, or Firm* — Shimokaji IP

(57) ABSTRACT

A method and a system for implementing a side function key is provided, comprising: detecting whether a side of a mobile terminal simultaneously has at least two finger touch points, if yes, displaying an icon of the function key on a side of the touchscreen of the mobile terminal, and implementing a corresponding function in response to a clicking of the icon of the function key. The method and system may comprise: detecting whether one side of a mobile terminal has finger touch points, if at least two finger touch points are simultaneously detected, then displaying a function key, thereby achieving a function of the function key on a side of the mobile terminal.

20 Claims, 4 Drawing Sheets

Detect whether a side of a mobile terminal simultaneously has at least two finger touch points — S101

When it is detected that the side simultaneously has at least two finger touch points, displaying an icon of the function key on the side of the touchscreen of the mobile terminal, and implementing the corresponding function by clicking the icon of the function key — S102

(52) U.S. Cl.
CPC .............. *G06F 2203/04104* (2013.01); *G06F 2203/04808* (2013.01)

(56) References Cited

U.S. PATENT DOCUMENTS

| | | | |
|---|---|---|---|
| 2014/0289642 A1* | 9/2014 | Prasad | G06F 3/048 715/745 |
| 2014/0320420 A1* | 10/2014 | Ida | G06F 3/044 345/173 |
| 2015/0143295 A1* | 5/2015 | Jeong | G06F 3/04842 715/825 |
| 2016/0041674 A1* | 2/2016 | Xia | G06F 3/0416 345/173 |
| 2016/0062515 A1* | 3/2016 | Bae | G06F 3/0414 345/174 |
| 2016/0070412 A1* | 3/2016 | Shimazu | G06F 3/0416 345/173 |
| 2016/0227022 A1* | 8/2016 | Alameh | G06F 1/1643 |

* cited by examiner

METHOD AND SYSTEM FOR REALIZING FUNCTIONAL KEY ON SIDE SURFACE

TECHNICAL FIELD

The present disclosure relates to the field of mobile terminals, and in particular to a method and a system for implementing a side function key.

BACKGROUND

At present, mobile terminals like cell phones typically have a function key, such as a home key, a return key or a setting key, at the bottom; some cell phones only have one or two buttons, some of the buttons are implemented through physical mechanical buttons, and some are implemented through individual capacitive touch buttons. Thus, existing function keys occupy a relatively large area of the mobile terminal, and moreover, an antenna at a bottom of the mobile terminal is affected to certain degree since the buttons have electrically conductive substances.

As a result, the prior art is in need of improvement and development.

SUMMARY

In light of the above drawbacks of the prior art, a method and a system for implementing a side function key is provided, which intends to solve the problem that the function key at the bottom of an existing mobile terminal takes up a large area and affects the antenna at the bottom.

To attain the above object, the following technical solutions are provided:

In an embodiment, a method for implementing a side function key is provided, including:
  Detecting whether a side of a mobile terminal simultaneously has at least two finger touch points;
  in response to detecting that the side simultaneously has at least two finger touch points, turning on a timer;
  When a time set on the timer is up, detecting that position changes of the finger touch points are within a predetermined range;
  displaying an icon of a function key on a side of a touchscreen of the mobile terminal; and
  When the touchscreen does not receive a click instruction within a predetermined time, not displaying the icon of the function key.

In a further embodiment, the method for implementing a side function key further includes: wherein the detecting whether the side of the mobile terminal simultaneously has at least two finger touch points comprises:
  Detecting that one side of the mobile terminal simultaneously has at least two finger touch points and an opposing side has one finger touch point.

In yet a further embodiment, the method for implementing a side function key further includes: wherein the icon of the function key is displayed in a translucent state.

In yet a further embodiment, the method for implementing a side function key further includes: wherein the icon of the function key is displayed in an opaque state.

In yet a further embodiment, the method for implementing a side function key further includes: wherein the icon of the function key is displayed in an upright mode.

In yet a further embodiment, the method for implementing a side function key further includes: wherein the icon of the function key is displayed in a sideways mode.

In an embodiment, a method for implementing a side function key is provided, including:
  Detecting whether a side of a mobile terminal simultaneously has at least two finger touch points;
  in response to detecting that the side simultaneously has at least two finger touch points, displaying an icon of a function key on a side of a touchscreen of the mobile terminal, and implementing a corresponding function in response to a clicking of the icon of the function key.

In a further embodiment, the method for implementing a side function key further includes: wherein the detecting comprises:
  in response to detecting that the side simultaneously has at least two finger touch points, turning on a timer;
  When a time set on the timer is up, detecting that position changes of the finger touch points are within a predetermined range.

In yet a further embodiment, the method for implementing a side function key further includes: wherein the detecting comprises: detecting that one side of the mobile terminal simultaneously has at least two finger touch points and that an opposing side of the mobile terminal has one finger touch point.

In yet a further embodiment, the method for implementing a side function key further includes:
  When the touchscreen does not receive a click instruction within a predetermined time, not displaying the icon of the function key.

In yet a further embodiment, the method for implementing a side function key further includes: wherein the icon of the function key is displayed in a translucent state.

In yet a further embodiment, the method for implementing a side function key further includes: wherein the icon of the function key is displayed in an opaque state.

In yet a further embodiment, the method for implementing a side function key further includes: wherein the icon of the function key is displayed in an upright state.

In yet a further embodiment, the method for implementing a side function key further includes: wherein the icon of the function key is displayed in a sideways mode.

In an embodiment, a system for implementing a side function key is provided, including one or more modules configured to:
  detect whether one side of a mobile terminal simultaneously has at least two finger touch points;
  in response to detecting that the side simultaneously has at least two finger touch points, displaying an icon of a function key on a side of a touchscreen of the mobile terminal, and implementing a corresponding function in response to a clicking of the icon of the function key.

In a further embodiment, the system for implementing a side function key further includes: wherein the one or more modules are further configured to:
  when it is detected that the side simultaneously has at least two finger touch points, turning on a timer;
  when a time set on the timer is up, detecting that position changes of the finger touch points are within a predetermined range.

In yet a further embodiment, the system for implementing a side function key further includes: wherein the detecting further detects whether an opposing side of the mobile terminal also has a finger touch point.

In yet a further embodiment, the system for implementing a side function key further includes: wherein the one or more modules are further configured to: when the touchscreen does not receive a click instruction within a predetermined time, not displaying the icon of the function key.

Accordingly, a system and method is described that detects whether one side of a mobile terminal has finger touch points, if at least two finger touch points are simultaneously detected, then the mobile terminal displays the function key, thereby achieving a function of the function key on the side of the mobile terminal without needing to reserve space for physical or capacitive buttons for the function key, advantageously enabling a compact form factor for the mobile terminal.

DETAILED DESCRIPTION

The present invention provides a method and a system for implementing a side function key. To make the object, technical solution and effect of the present invention clearer and more specific, the present invention will be further described in detail below. It should be understood that the specific embodiments described herein are only used to describe the present invention, not to limit the present invention.

Figure 1:
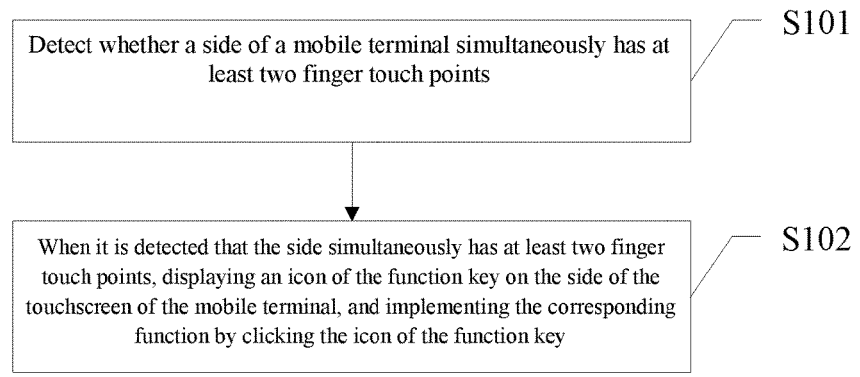
FIG. 1 depicts a flow chart of a method for implementing a side function key, according to a preferred exemplary embodiment of the present invention.

Referring to FIG. 1, FIG. 1 depicts a flow chart of a method for implementing a side function key, according to a preferred exemplary embodiment of the present invention. As shown in the figure, it comprises:

Detecting whether one side of a mobile terminal simultaneously has at least two finger touch points; (Block S101)

In response to detecting that the side simultaneously has at least two finger touch points, displaying an icon of a function key on a side of a touchscreen of the mobile terminal, and implementing a corresponding function in response to a clicking of the icon of the function key. (Block S102)

Figure 2:
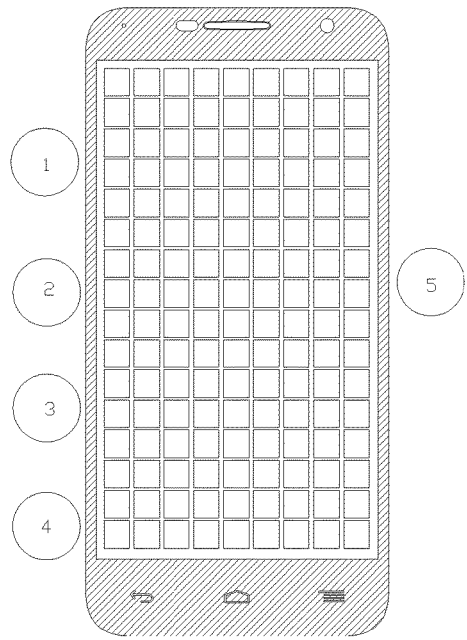
FIG. 2 illustrates a distribution of finger touch points when a cell phone is held by one hand, according to an exemplary embodiment of the present invention.

As shown in FIG. 2, for a typical pose where one hand holds a mobile terminal (with a cell phone as an example), five fingers may be simplified as five points shown in the figure (right hand holding the cell phone), Points 1, 2, 3, and 4 represent four fingers at the left side, respectively, and Point 5 represents the thumb. For a cell phone touchscreen with high sensitivity, therefore, one hand holding the cell phone can be simplified to the impact of five conductive objects on the touchscreen, and the impact of these five points on the touchscreen can be detected through a touch control software algorithm, namely five finger touch points can be detected. However, the detection of these five finger touch points is not a goal of the present invention, namely a method commonly used in the prior art can be used to detect these five finger touch points, such as by a proximity sensor. Due to different ways of holding, moreover, what a system detects may not necessarily be five finger touch points, which may probably be four or fewer finger touch points.

By using the position information of these detected finger touch points, the present invention establishes a dynamic icon (an icon of a function key), the icon is located at a side of the touchscreen (e.g. left side or right side, or top side or bottom side of the touchscreen), the icon of the function key may be displayed in a translucent or opaque state, the function key is virtual and used to take the place of a conventional fixed function key at the bottom of a cell phone, and moreover, the function key may be dynamic and changing. When the function key is needed, a finger is pressed on the side of the cell phone, when the touchscreen controller detects information that the side simultaneously has at least two finger touch points, the touchscreen can display an icon of a corresponding function key, and a corresponding function can be achieved in response to a clicking of said icon, which may include a return button, home button, menu button, etc.

Figure 3:
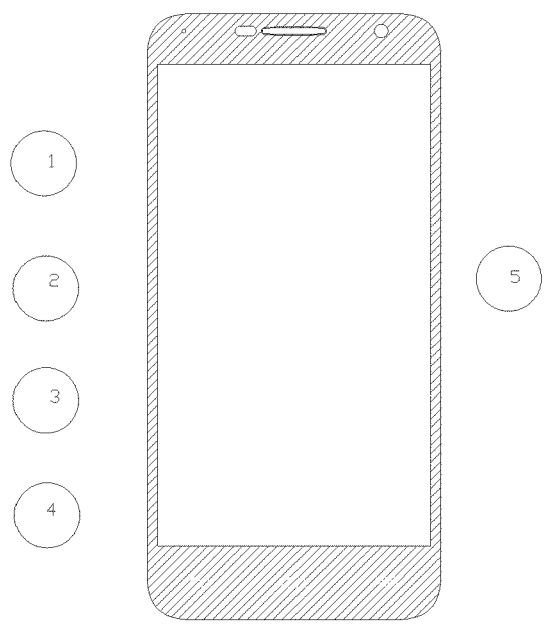
FIG. 3 depicts a schematic diagram of a structure that a function key at the bottom of a mobile terminal is removed, according to an exemplary embodiment of the present invention.
Figure 4:
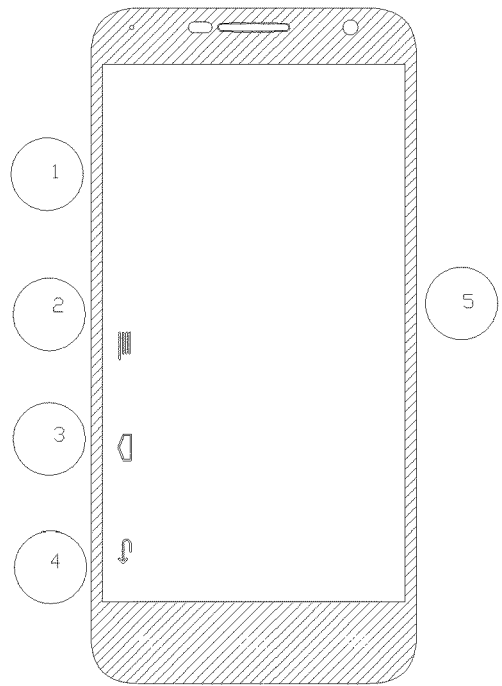
FIG. 4 depicts a schematic diagram of a distribution of function keys according to an exemplary embodiment of the present invention.

As shown in FIG. 3 below, by removing the original function key at the bottom of a cell phone, a relatively large space can be saved for other function areas, or the area at the bottom may be reduced such that the cell phone has a smaller size. During normal use, when the function key is not needed, the display of the function key icon may be omitted (i.e. not displaying the function key icon), to facilitate the display of more of the other information; when the function key is needed, a finger is moved to close to the side of the mobile terminal, and at this moment, the touchscreen controller detects the position information of finger touch points, typically four or five finger touch points. Position information of at least two finger touch points thereof may be selected, the position herein meaning the distance between a finger touch point and the bottom of the cell phone, namely the commonly known vertical direction or Y axis. This position information is selected because the function key icon needs to be displayed at a side of the touchscreen to prevent impact on other displayed information. As shown in FIG. 4, three points, Points 2, 3, and 4, may be selected as positions to display three function key icons at the side of the cell phone. The icons may cover the originally displayed information, or may be displayed in a translucent state over the original image, dependent on design requirements.

Figure 5:
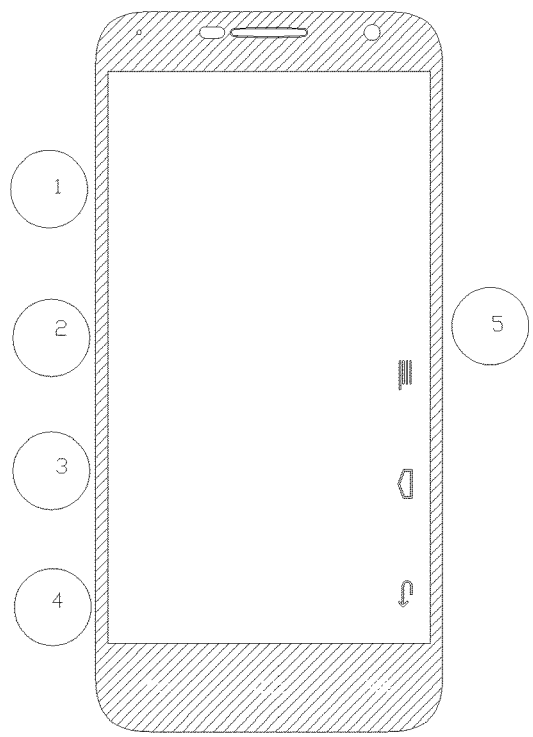
FIG. 5 depicts a schematic diagram of a distribution of function keys according to another exemplary embodiment of the present invention.

When the function key icons are displayed, a corresponding function may be turned on by clicking an icon. For a relatively small screen, a thumb may be used to directly click, and for a relatively large screen, a finger of another hand may be used for operations. The function key icons may be displayed at the other side, as shown in FIG. 5, and in this case, the icons are closer to the thumb, which facilitates single-handed operations.

Block S102 may comprise:

In response to detecting that the side simultaneously has at least two finger touch points, turning on a timer;

When a time set on the timer is up, detecting that position changes of the finger touch points are within a predetermined range.

In a state that the cell phone touchscreen display is turned on, if the information of finger touch points is detected at the left side or right side of the cell phone, e.g. the information of two or more fingers is simultaneously detected, a timer is turned on at this moment, the touch controller will delay a time period (i.e. the time set on the timer), the time period may be 100 milliseconds or other values, depending on the need by the control chip, and then the detection continues. If the position changes of the finger touch points are not within a predetermined range, detection is performed again; if the position changes of the finger touch points are detected to be within a predetermined range, e.g. identical with or similar to the previous data, the function key icons are correspondingly displayed, which may be 2 or 3 icons, at most 4 icons, the icons are located at the side of the touchscreen to avoid impact on other displayed contents as much as possible, as shown in FIG. 4 or FIG. 5, the positions in the vertical direction primarily use the finger positions as reference, in other words, preferably at the same height as the finger touch points. The function key icons may be on the same side as the finger touch points, or may be displayed at the other side. At this moment, if a corresponding icon is clicked, the display interface is switched to a new interface, and the original function key icons may continue to be displayed at the original positions, or may be no longer displayed.

With respect to the predetermined range, a change threshold may be set to detect whether a position change of each finger touch point exceeds said change threshold, if yes, it indicates that the finger touch point exceeds the predetermined range, it may be that position changes of all finger touch points exceed the predetermined range, or may be that position changes of at least two finger touch points thereof exceed the predetermined range, then it is determined that there is no need to display the function key icons, otherwise they need to be displayed.

After block S102, the method may further include:

When the touchscreen does not receive a click instruction within a predetermine time, not displaying the icon of the function key.

When the system touchscreen does not receive a click instruction within a predetermined time, e.g. 5 seconds, it may exit the display state of said function key and discontinue displaying the icon of the corresponding function key, until conditions for next detection are satisfied. More specifically, if the icon of the function key does not receive a click instruction within a predetermined time, e.g. 5 seconds, it may exit the display state of said function key and not display the icon of the corresponding function key, until conditions for next detection are satisfied. In other words, there is no need to display a function key if a user does not click the function key for a long time.

In block S101, the detecting may include whether one side of the mobile terminal simultaneously has at least two finger touch points and whether the opposing side of the mobile terminal also has finger touch point, if yes, proceeding to the step S102. In other words, preferably, function key icons are displayed not only when there are at least two finger touch points, but also when opposing sides (one side and its opposing side) both have finger touch points, which better reflects the situation of single- or double-handed cell phone holding.

In block S101, the detecting may include whether one side of the mobile terminal simultaneously has two, three or four finger touch points; and whether the opposing side has one finger touch point. For example, if a right hand holds the mobile terminal, the left side of the mobile terminal has at least two, three or four finger touch points, and the right side of the mobile terminal has one finger touch point, i.e. the thumb. Therefore, it can be determined that the user is holding the mobile terminal with the right hand, and the function key icons can be displayed. In the case where a left hand holds the mobile terminal, the right side of the mobile terminal has at least two, three or four finger touch points, and the left side of the mobile terminal has one finger touch point, i.e. the thumb.

Figure 6:
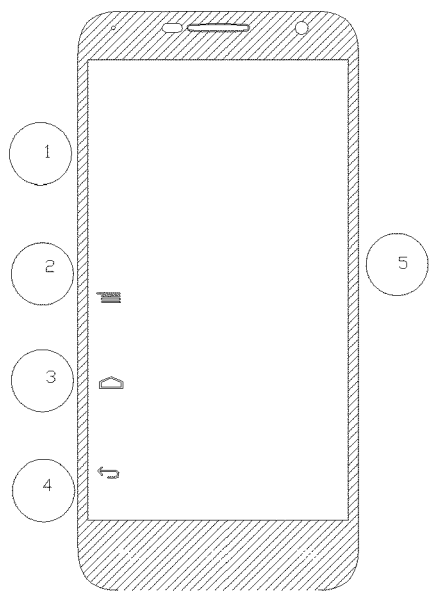
FIG. 6 depicts a schematic diagram of a distribution of function keys according to yet another exemplary embodiment of the present invention.
Figure 7:
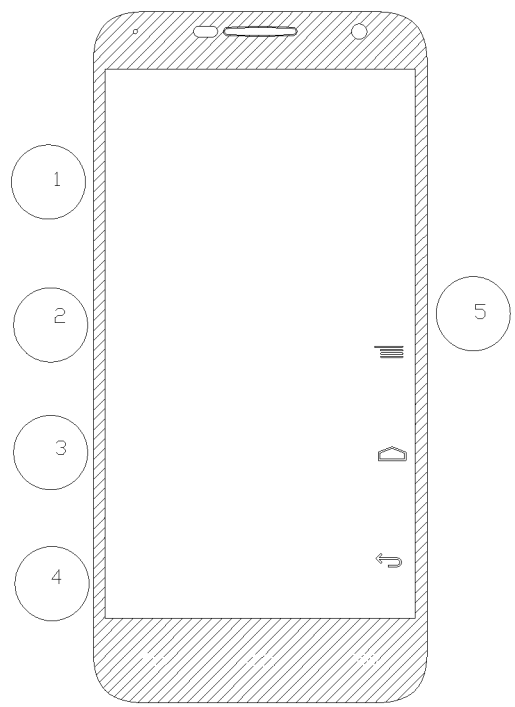
FIG. 7 depicts a schematic diagram of a distribution of function keys according to yet another exemplary embodiment of the present invention.

Moreover, the function key icons can be displayed in an upright or sideways mode. The upright mode may be the original display mode for the function keys, as shown in FIG. 6 or FIG. 7, while the sideways mode displays in a way that is perpendicular to the upright mode, as shown in FIG. 4 or FIG. 5.

Figure 8:
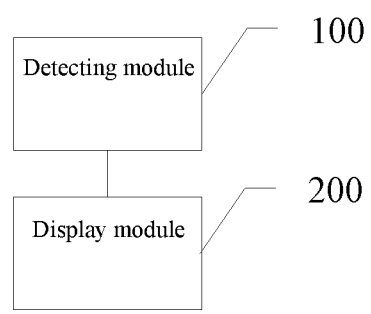
FIG. 8 is a block diagram of a structure of a system for implementing a side function key according to an exemplary embodiment of the present invention.

Based on the method above, a system for implementing a side function key is also provided, as shown in FIG. 8, which may include:

A detecting module 100, detecting whether one side of a mobile terminal simultaneously has at least two finger touch points;

A display module 200, wherein in response to detecting module 100 detecting that the side simultaneously has at least two finger touch points, the display module 200 displays an icon of the function key on a side of a touchscreen of the mobile terminal, and implementing a corresponding function in response to a clicking of the icon of the function key.

Furthermore, the display module 200 may include:

A timer turn-on unit that, when detecting that the side simultaneously has at least two finger touch points, turns on a timer;

A determining unit that, when a time set on the timer is up, detects whether position changes of the finger touch points are within a predetermined range.

Furthermore, the detecting module 100 may further detect whether one side of the mobile terminal simultaneously has at least two finger touch points and whether an opposing side of the mobile terminal also has a finger touch point.

Furthermore, the system may further include:

A cancellation module that, when the touchscreen does not receive a click instruction within a predetermine time, not displaying the icon of the function key.

In summary, a system and method is described that detects whether one side of a mobile terminal has finger touch points, if at least two finger touch points are simultaneously detected, then the mobile terminal displays the function key, thereby achieving a function of the function key on the side of the mobile terminal without needing to reserve space for physical or capacitive buttons for the function key, advantageously enabling a compact form factor for the mobile terminal.

The system for implementing a side function key above and the method for implementing a side function key in the above embodiments belong to the same concept, thus, any method according to the method embodiment for implementing a side function key may be carried out on the system for implementing a side function key, please see the method embodiment for implementing a side function key for a specific implementation process thereof.

It should be noted that, with respect to the method for implementing a side function key in an embodiment of the present invention, those skilled in the art may understand that all or a part of the flow to implement the method for implementing a side function key in the embodiment of the present invention may be achieved through a computer program to control relevant hardware, and said computer program may be stored in a computer readable memory medium, e.g. stored in a memory of a mobile terminal, and executed by at least one processor in said mobile terminal, and the execution process may comprise a flow such as those in the embodiments of the above methods. Wherein, the memory medium may be a magnetic disk, compact disc, Read Only Memory (ROM) or Random Access Memory (RAM).

With respect to the system for implementing a side function key in an embodiment of the present invention, all function modules thereof may be integrated in a processing chip, or each module may exist individually and physically, or two or more modules may be integrated in one module. The above integrated module may be implemented in a form of hardware, or may be implemented in a form of a software function module. If the integrated module is implemented in a form of a software function module and sold or used as an independent product, it may also be stored in a computer readable memory medium, and said memory medium may be, for example, a Read Only Memory, magnetic disk, or compact disc.

It should be understood that applications of the present invention are not limited to the above examples. To those skilled in the art, improvements or modifications may be made according to the description above, and all of these improvements and modifications shall be encompassed by the appended claims of the present invention.

The invention claimed is:

1. A method for implementing a side function key of a mobile terminal, wherein the mobile terminal comprises a detecting module, a display module and a cancellation module, wherein the side function key is selected from the group of a home key, a return key, a menu key, and a setting key, wherein the method comprises:
    detecting, via the detecting module, whether a side of the mobile terminal simultaneously has at least two finger touch points;
    in response to detecting that the side simultaneously has at least two finger touch points, turning on, via the display module, a timer;
    when a time set on the timer is up, determining, via the display module, if current finger touch point positions exceed a change threshold as compared to finger touch point positions prior to turning on the timer;
    in response to the time set on the timer being up and determining that the current finger touch point positions do not exceed the change threshold, generating and displaying, controlled by the display module, a dynamic icon of the function key disposed to a side of a touchscreen of the mobile terminal that covers any displayed information that was on the touchscreen before the timer is up;
    in response to the dynamic icon of the function key being clicked, turning on a corresponding function;
    in response to the turning on a corresponding function, displaying a new interface on the touchscreen of the mobile terminal and continuing to display the dynamic icon of the function key at original positions of the dynamic icon of the function key; and
    in response the dynamic icon of the function key not being clicked within a predetermined time, discontinuing, via the cancellation module, the display of the dynamic icon of the function key.

2. The method of claim 1, wherein the detecting whether the side of the mobile terminal simultaneously has at least two finger touch points comprises:
    detecting that one side of the mobile terminal simultaneously has at least two finger touch points and an opposing side has one finger touch point.

3. The method of claim 1, wherein the dynamic icon of the function key is displayed in a translucent state.

4. The method of claim 1, wherein the dynamic icon of the function key is displayed in an opaque state.

5. The method of claim 1, wherein the dynamic icon of the function key is displayed in an upright mode.

6. The method of claim 1, wherein the dynamic icon of the function key is displayed in a sideways mode.

7. The method of claim 1 wherein:
    the corresponding function is selected from the group of:
        a home key function, a return key function, a setting key function, and a menu key function.

8. A method for implementing a side function key of a mobile terminal, wherein the mobile terminal comprises a detecting module, a display module and a cancellation module, wherein the side function key is selected from the group of a home key, a return key, a menu key, and a setting key, wherein the method comprises:
    showing originally displayed information on a touchscreen of a mobile terminal;
    detecting, via the detecting module, whether a side of the mobile terminal simultaneously has at least two finger touch points;
    in response to detecting that the side simultaneously has at least two finger touch points, generating and displaying, controlled by the display module, a dynamic icon of at least one function key on a side of a touchscreen of the mobile terminal over the originally displayed information, and implementing a corresponding function in response to a clicking of the dynamic icon of the function key,
    wherein the implementing a corresponding function comprises displaying a new interface according to the corresponding function on the touchscreen of the mobile terminal and continuing to display the dynamic icon of the function key at original positions of the dynamic icon of the function key on the touchscreen.

9. The method of claim 8, wherein the detecting comprises:
    in response to detecting that the side simultaneously has at least two finger touch points, turning on a timer by the display module;
    when a time set on the timer is up, detecting, via the display module, that position changes of the finger touch points are within a predetermined range.

10. The method of claim 8, wherein the detecting comprises: detecting, via the detecting module, that one side of the mobile terminal simultaneously has at least two finger touch points and that an opposing side of the mobile terminal has one finger touch point.

11. The method of claim 8, further comprising:
    in response to the touchscreen not receiving a click instruction within a predetermined time after detecting that the side simultaneously has at least two finger touch points, not displaying, controlled by the cancellation module, the dynamic icon of the function key to display the originally displayed information on the touchscreen.

12. The method of claim 8, wherein the dynamic icon of the function key is displayed in a translucent state.

13. The method of claim 8, wherein the dynamic icon of the function key is displayed in an opaque state.

14. The method of claim 8, wherein the dynamic icon of the function key is displayed in an upright mode.

15. The method of claim 8, wherein the dynamic icon of the function key is displayed in a sideways mode.

16. A mobile terminal comprising:
    a touchscreen configured to display images;
    a detecting module including at least one processing chip configured to detect whether one side of the mobile terminal simultaneously has at least two finger touch points; and
    a display module including at least one processing chip configured to, in response to detecting that the side simultaneously has at least two finger touch points, generate and display a dynamic icon of a function key onto a side of the touchscreen over an original image displayed before detecting that the side simultaneously has at least two finger touch points, and implementing a corresponding function in response to a clicking of the dynamic icon of the function key,
    wherein the implementing a corresponding function comprises displaying a new interface according to the corresponding function on the touchscreen of the mobile terminal and continuing to display the dynamic icon of the function key at original positions of the dynamic icon of the function key on the touchscreen.

17. The mobile terminal of claim 16, wherein :
    a timer, controlled by the display module, is configured to turn on in response to the detecting module detecting that the side simultaneously has at least two finger touch points; and
    the display module is configured to determine if positions of the finger touch points, after the timer is up, are below a predetermined threshold as compared to the positions of finger touch points prior to the timer being turned on.

18. The mobile terminal of claim 16, wherein the detecting module is further configured to detect whether an opposing side of the mobile terminal also has a finger touch point.

19. The mobile terminal of claim 16, wherein:
    a cancellation module is configured to discontinue the display of the dynamic icon when the touchscreen does not receive a click instruction within a predetermined time.

20. The mobile terminal of claim 16, wherein:
    the corresponding function is selected from the group of: a home key function, a return key function, a setting key function, and a menu key function.

* * * * *